United States Patent [19]
Kirkpatrick et al.

[11] 4,363,628
[45] Dec. 14, 1982

[54] BANK TRAINING DEVICE

[75] Inventors: C. Virginia Kirkpatrick; Grace E. Watson, both of St. Louis, Mo.

[73] Assignee: Mark Twain Bancshares, St. Louis, Mo.

[21] Appl. No.: 271,796

[22] Filed: Jun. 8, 1981

[51] Int. Cl.³ ......................... G09B 19/00; A63F 3/00
[52] U.S. Cl. ................................ 434/107; 273/256; 434/347
[58] Field of Search ............... 434/107, 219, 245, 347; 273/256, 278, 243, 302

[56] References Cited
U.S. PATENT DOCUMENTS

| | | | |
|---|---|---|---|
| 1,635,734 | 7/1927 | Ziegler | 434/347 X |
| 2,693,961 | 11/1954 | Ripley | 273/256 |
| 4,029,320 | 6/1977 | Hausman | 434/347 X |
| 4,121,823 | 10/1978 | McBride | 273/243 X |
| 4,189,153 | 2/1980 | Zollinger | 273/256 |
| 4,273,337 | 6/1981 | Carrera et al. | 273/243 |

Primary Examiner—William H. Grieb
Attorney, Agent, or Firm—Neal Kalishman

[57] ABSTRACT

A device and method of training bank personnel utilizing game techniques. The game board comprises several connected continuous circuits. The circuits have spaces which direct the players to stacks of question and answer cards. The winner is determined by the player who answers the most questions or certain specified questions. The game also instructs in proper procedural and ethical conduct.

10 Claims, 6 Drawing Figures

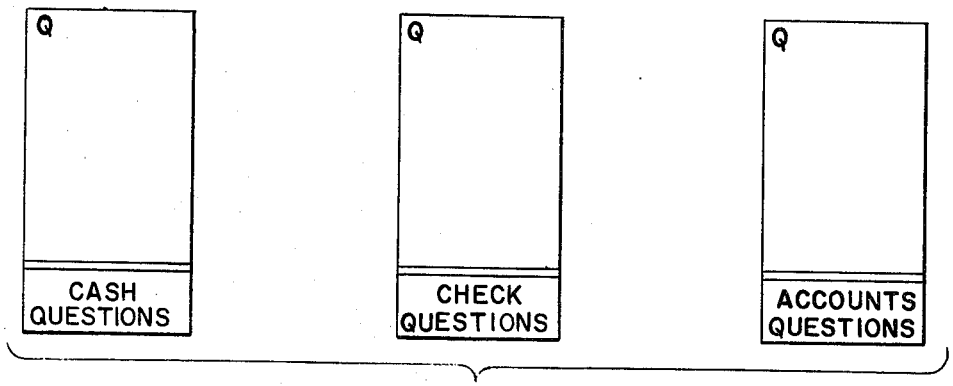
FIG-2
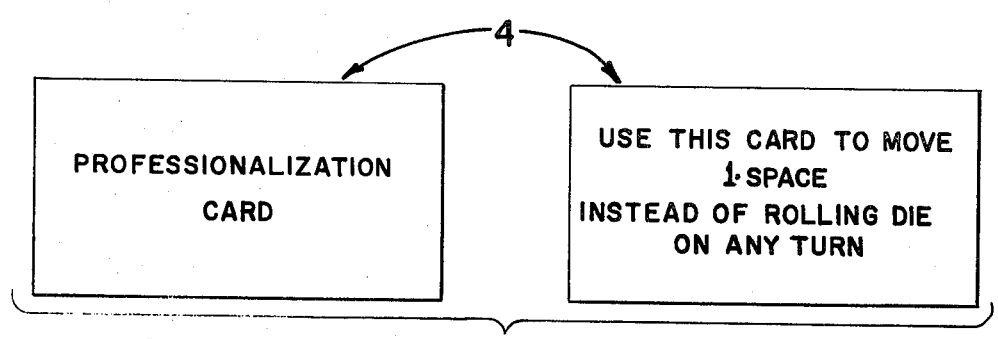
FIG-3
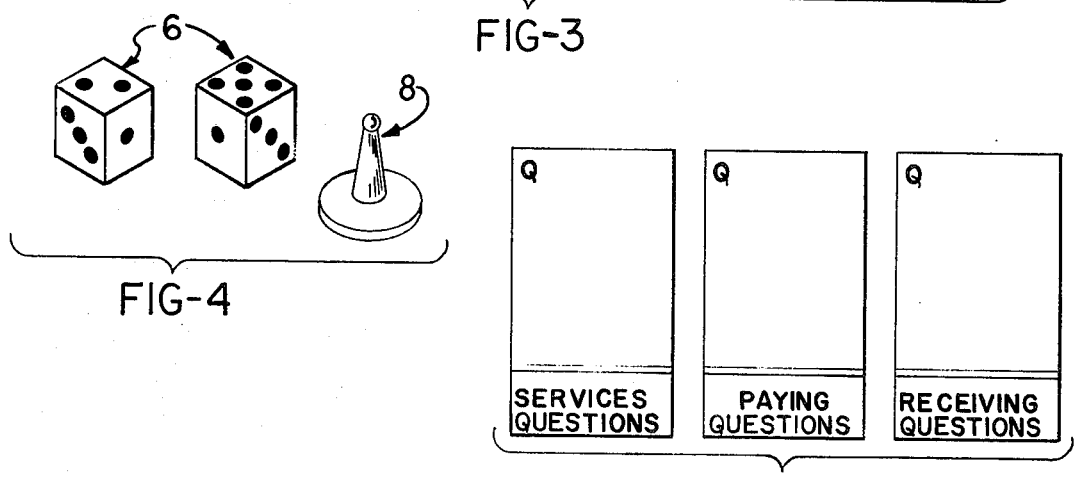
FIG-4
FIG-5
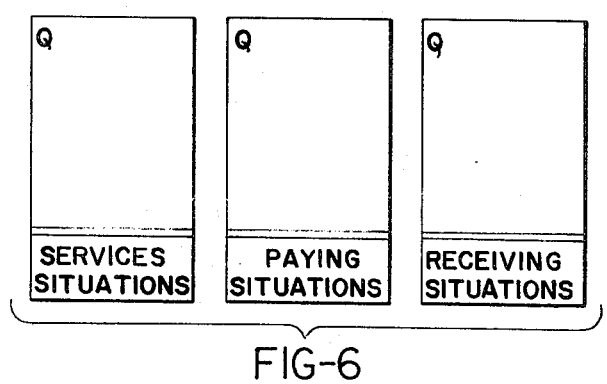
FIG-6

BANK TRAINING DEVICE

BACKGROUND OF THE INVENTION

1. Field of the Invention

The present invention is directed to a device and system for re-enforcing bank procedures. Specifically, the invention is concerned with a device which is effective in training in a nonthreatening, enjoyable manner employees who perform structured functions.

2. Description of the Prior Art

Training of employees is an important function in banking operations. This is especially true of employees who perform functions that require knowledge and use of detailed procedures. Examples of classifications of such employees are tellers, loan documentation personnel, new accounts representatives and employees who are responsible for the functioning of the basic credit areas.

The traditional methods of instructing bank employees include the use of manuals, lectures, programmed instruction, self testing, self instructional tapes, simulation, repetitive practicing, and case study. These methods are the same methods which the employees encountered in their formal schooling and so may be associated in the employee's mind with bad experiences, boredom and as requiring substantial effort on the part of the employee. Also, resistence due to perceived boredom is met when employees must repeatedly participate in such exercises for re-enforcement purposes.

To facilitate retention of procedures and concepts it is important that personnel be exposed to the subject matter on a repeated basis. It is important that the material be presented in a manner that is not offensive or degrading to the employee. Traditional methods of instruction are therefore unsuitable for maintaining employee skill level.

There have been proposals to utilize board games as a means of training bank personnel. However, such games require an element of luck, do not require each player to cover all aspects of the instructional training and do not provide flexibility with respect to emphasis of material and usage of the same board for different bank functions.

An objective of the invention is to provide a means for training banking personnel which is effective. Another objective is to provide a training device which the trainee finds enjoyable and desires to utilize. A third objective is to provide a training method which can be used by all bank personnel regardless of position to refamiliarize themselves with the technicalities of different bank functions. A further objective is to provide a training device which gives the appearance of a game and not of an educational device and can be used to train in a nondemeaning manner.

SUMMARY OF THE INVENTION

The present invention provides a device for training bank employees comprising a board means which has marked spaces in the shape of at least two connected continuous circuits. Certain of the spaces are designated to refer the player to specific groups of question and answer cards. Also included are a chance means and a means of marking a player's position on the board.

BRIEF DESCRIPTION OF THE DRAWINGS

FIG. 2 shows examples of blank question cards.

FIG. 3 shows examples of the front and back of the professionalization cards.

FIG. 4 shows sample dice and markers.

FIG. 5 shows examples of blank question cards.

FIG. 6 shows examples of blank situation cards.

DESCRIPTION OF THE PREFERRED EMBODIMENTS

Figure 1:
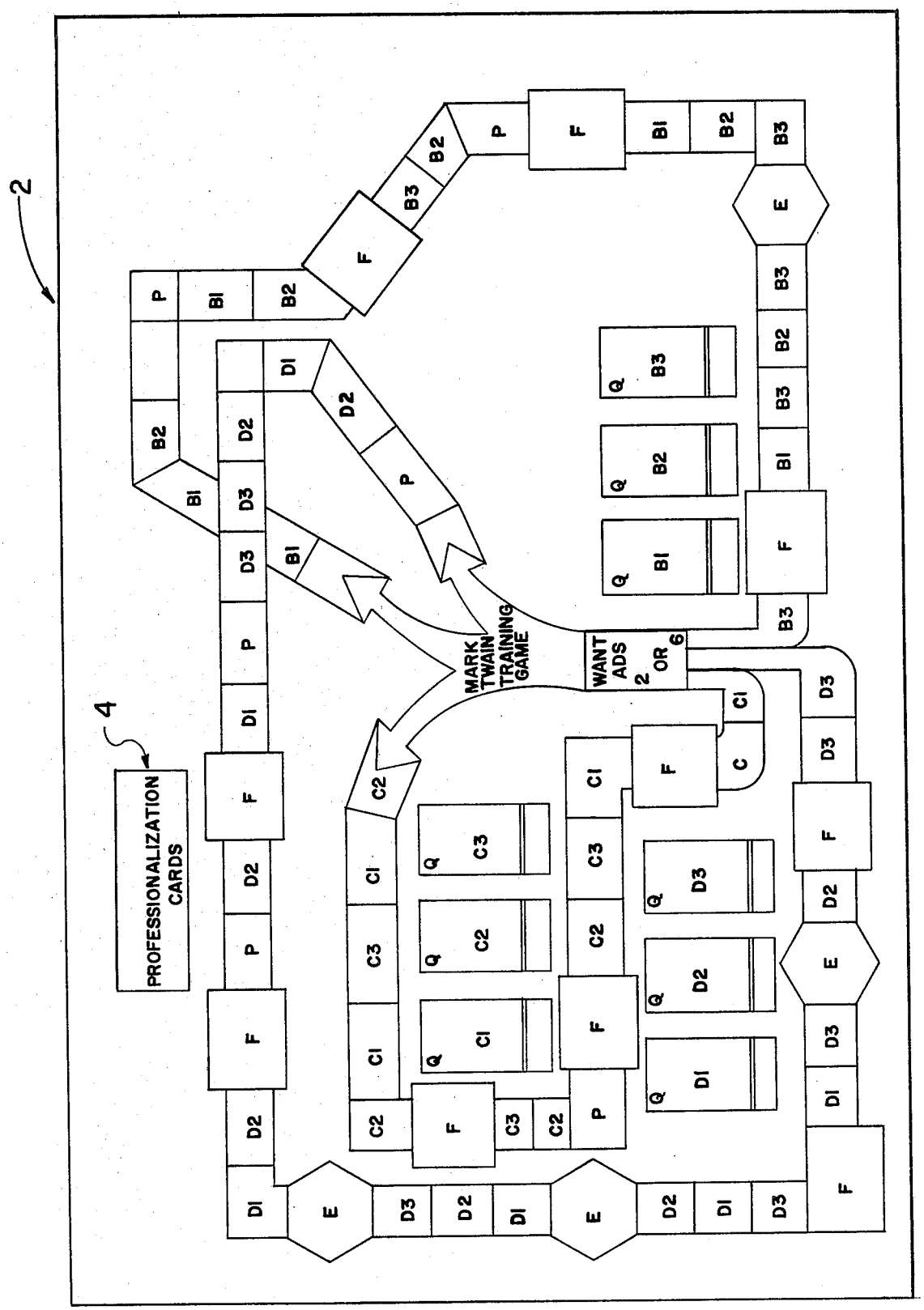
FIG. 1 shows the game board of the invention.

The present invention is directed to a device for both initial and refresher training of bank personnel. As illustrated by FIGS. 1, 2, 3, 4, 5 and 6 the device is comprised of a game board 2; playing cards "B", i.e. $B_1$, $B_2$, $B_3$, "C", i.e. $C_1$, $C_2$, $C_3$, and "D", i.e. $D_1$, $D_2$, $D_3$; space advancement or professionalization cards 4; chance mechanism or dice 6; and player markers 8.

Referring in particular to FIG. 1, the game board 2 contains a course or circuit which is composed of at least two continuous branches that meet at a common space on the board. Each branch is divided into a number of spaces. The majority of the spaces in each branch requires the player to select a card from a particular stack of cards such as one of the "B", "C" or "D" cards and answer the question written thereon. The answers to the questions are contained on the reverse side of the cards.

The number of groups or question and answer cards should preferably correspond to the number of branches in the course. Each group of cards also preferably is comprised of a number of subgroups, i.e. group "B" is comprised of subgroups $B_1$, $B_2$ and $B_3$. The number of groups and subgroups of cards is not critical nor is the number of cards in each subgroup, usually about 20. The groups and subgroups of question and answer cards can differ from each other in subject matter and/or level of difficulty. FIGS. 2, 5 and 6 illustrate different groups and subgroups of cards that can be employed if the game is to be employed in the training of tellers.

The game is particularly suited for the training of tellers, new accounts personnel, item processing personnel, load documentation personnel and those involved with basic credit responsibilities. The following are sample question and answer cards which illustrate the wide range of concepts that can be taught utilizing the game of the present invention:

Load Documentation

1. What is the name of the contract that is a written promise to pay back to the bank the amount of a loan?
A. Promissory note.
2. What is a maturity date?
A. The data a note falls due or when it is payable.
3. What is the term of a note?
A. The length of time from the date to the due (maturity) date.
4. What is a secured note?
A. The borrower has signed a security agreement giving the bank the right to sell certain of the borrower's property if he fails to repay the loan.
5. What is an unlimited guarantee?
A. The guarantor assumes responsibility for the amount of a note plus any future loans the borrower makes.

Item Processing

1. Define the drawer of a check.
A. The maker or person writing and signing a check.
2. What is an endorsement?
A. Signature of the payee on the back of a check.

3. How often does the bank usually send a checking account statement to its customers?
A. Generally, once a month.
4. What does a regular checking account statement show?
A. All the activity in the account for the preceding month. All deposits made and checks paid, the service charge, if any, and any other debits and credits posted to the account.
5. What is the service charge on a budget account if 9 of the customer's checks are paid during the month and his minimum balance is $325.00?
A. $1.90–$1.00 statement charge, $.10 for each check paid.

New Accounts

1. What is the maximum amount allowed by law in a commercial savings account?
A. $150,000.00.
2. What is the name of the savings account offered to businesses?
A. Money Manager Account.
3. How often are statements issued on Money Manager Accounts?
A. Monthly.
4. How frequently is interest compounded on Money Manager Accounts?
A. Monthly.
5. What is the rate of interest paid on 6-month Money Market Certificates?
A. The rate changes weekly and is based on the average discount rate on 6-month U.S. Treasury Bills.

Tellers

1. How does a customer activate the line of credit on a Captain's account?
A. By writing a check in excess of the account balance or by requesting that a certain amount be deposited in the account.
2. Define the drawee of a check.
A. The bank on which a check is drawn.
3. What should you look at when counting cash?
A. The portrait.
4. How soon after a series EE Bond is issued can it be redeemed?
A. 6 months.
5. In what situation can you cash a check made payable to a company?
A. For the owner of a single-owned proprietorship.

Those spaces in each branch which are not question and answer spaces are occupied by playing instructions. Those spaces denoted by the letter "E" provide illustrations of proper ethical and procedural conduct and allow the player to take an additional turn. Examples of appropriate phrasology for these spaces are:

You have a perfect balancing record for the month. TAKE ANOTHER TURN.
You receive a $200 stolen check from a man passing as a customer and are able to delay him until the police arrive. TAKE ANOTHER TURN.

Those spaces denoted by the letter "F" contain illustrations of improper ethical and procedural conduct and require the player to return a question card that may have been acquired. Examples of appropriate phrasology for these spaces are:

While working on night deposits, a customer approaches, your phone rings and a co-worker asks an urgent question. You come unglued. TURN IN ANY 1 SITUATION CARD.
An auditor finds your cash drawer over its limit. TURN IN A CASH QUESTION CARD.

Those spaces denoted by the letter "P" contain instructions to obtain a professionalism card. These cards may be retained and as shown in FIG. 3 allow the player to skip a roll of the dice. They provide the player flexibility in avoiding and landing on specific spaces.

The training device is used in the manner of a recreational game. To commence the training exercise each player (at least two) places his marker on the first space of one of the circuits which is the head of an arrow. In sequence each player rolls the dice 6 and moves his marker 8 along any one of the circuit branches the same number of spaces as he has rolled on the dice. If the marker lands on an "E", "F" or "P" space, then the instructions on such spaces are followed. Should the marker fall on a question space, then the player must take a card from the appropriate stack and answer the question. If the answer is correct, then the player is permitted to keep possession of the card. If the answer is incorrect, the next player is given the opportunity to answer the question. This passing of the card continues until one of the players provides the correct answer and that player is entitled to the card.

Whenever a player lands on "Want Ads", he must roll a 2 or 6 in order to move on to the next branch. A player may choose to travel on any of the branches, including those which he has already covered. The preferred object of the game is for a player to obtain and maintain possession of at least one card from each subgroup or to obtain the largest number of cards. The "F" spaces require the returning of cards to their respective stacks and the "E" spaces and professionalism cards can provide a strategic advantage in obtaining specific cards. These special boxes help emphasize the importance of proper procedural and ethical conduct. They also provide an element of unexpectability to the exercise. In order to win a player must have superior knowledge and cannot win simply through "luck".

The device is extremely effective in training personnel in a positive manner. Although it appears as a common game, the players absorb the subject matter by listening to the questions and answers as cards are drawn. The concentration level is naturally very high since it is important to answer questions correctly in order to win. The question cards are only obtainable by providing correct answers and never through "luck" or another player's misfortune. Not only is operational procedure taught but also professionalism is emphasized and rewarded. The game is versatile since it can be used by different levels of employees and be used to teach different bank functions. The game structure and objectives are dissimilar to conventional games which is important in order to achieve the teaching objectives of the device.

The invention may be embodied in other specific forms within departing from the spirit or essential characteristics thereof. The present embodiments are therefore to be considered in all respects as illustrative and not restrictive, the scope of the invention being indicated by the appended claims rather than by the foregoing description, and all charges which come within the meaning and range of equivalency of the claims are therefore intended to be embraced therein.

We claim:

1. A device for training bank employees comprising a board means which has marked spaces in the shape of at least two connected continuous circuits extending about the board, wherein certain of said spaces are designated to require a player to answer questions from specific question and answer cards which are grouped in different sets for association with each of the circuits; a chance means; and means for marking a player's position on said board.

2. The device of claim 1 wherein certain spaces of said circuits contain examples of proper ethical and procedural conduct for which a player is rewarded.

3. The device of claim 1 wherein certain spaces of said circuits contain examples of improper ethical and procedural conduct for which a player is penalized.

4. The device of claim 2 wherein certain spaces of said circuits contain examples of improper ethical and procedural conduct for which a player is penalized.

5. The device of claim 1 wherein certain spaces of said circuits allow a player to obtain a card which provides for space advancement.

6. The device of claim 4 wherein certain spaces of said circuits allow a player to obtain a card which provides for space advancement.

7. A method of training bank employees using the device of claim 1 comprising:
 (a) one or more players starting at the junction of all of the circuits and continually sequentially activating the numerical chance mechanism to determine the movement of their markers;
 (b) the players upon landing on a space requiring the selection of a question card, selects the appropriate question card and answers the question contained on said card;
 (c) a player answering said card maintains possession of said card, and
 (d) the training exercise ends after the achieving of an agreed upon result.

8. The method of claim 7 wherein certain spaces of said circuits contain examples of proper ethical and procedural conduct for which a player is rewarded.

9. The method of claim 8 wherein certain spaces of said circuits contain examples of improper ethical and procedural conduct for which a player is penalized.

10. The method of claim 9 wherein certain spaces of said circuits allow a player to obtain a card which provides for space advancement.

* * * * *